(12) United States Patent  
Bang et al.

(10) Patent No.: US 7,792,558 B2  
(45) Date of Patent: Sep. 7, 2010

(54) MOBILE COMMUNICATION DEVICE

(75) Inventors: Sung-Eun Bang, Gyeonggi-Do (KR); Ha-Yong Kim, Gyeonggi-Do (KR); Han-Bin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 687 days.

(21) Appl. No.: 11/730,909

(22) Filed: Apr. 4, 2007

(65) Prior Publication Data

US 2008/0070635 A1    Mar. 20, 2008

(30) Foreign Application Priority Data

Sep. 15, 2006    (KR) ...................... 10-2006-0089836

(51) Int. Cl.
*H04M 1/00* (2006.01)
(52) U.S. Cl. ............. 455/575.4; 455/550.1; 379/433.12
(58) Field of Classification Search ............. 455/550.1, 455/575.1, 575.3, 575.4; 379/428.01, 433.01, 379/433.11, 433.12, 440
See application file for complete search history.

(56) References Cited

U.S. PATENT DOCUMENTS

| 6,771,283 | B2 * | 8/2004 | Carro | .......................... 715/702 |
|---|---|---|---|---|
| 6,879,319 | B2 * | 4/2005 | Cok | ........................... 345/173 |
| 2003/0064685 | A1 | 4/2003 | Kim | |
| 2003/0095095 | A1 | 5/2003 | Pihlaja | |
| 2004/0239648 | A1 * | 12/2004 | Abdallah et al. | ............ 345/173 |
| 2006/0197750 | A1 | 9/2006 | Kerr et al. | |
| 2007/0008299 | A1 * | 1/2007 | Hristov | ........................ 345/173 |
| 2007/0035524 | A1 * | 2/2007 | Hyatt | ......................... 345/173 |

FOREIGN PATENT DOCUMENTS

| EP | 0 927 949 A2 | 7/1999 |
|---|---|---|
| JP | 10-073805 A | 3/1998 |
| KR | 10-2005-0009024 A | 1/2005 |

* cited by examiner

*Primary Examiner*—Nhan Le
(74) *Attorney, Agent, or Firm*—Birch, Stewart, Kolasch & Birch, LLP

(57) ABSTRACT

A mobile communication device for receiving and transmitting wireless communication signals including a body having a border portion, a display supported by the body, a touch screen adjacent the display and defining an exterior surface of the mobile communication device such that the display is visible through the touch screen, the touch screen transferring an input signal through electrodes disposed at an edge portion of the touch screen, and an electrode covering layer located above the electrodes of the touch screen. The border portion of the body and the outermost portion of the touch screen are substantially coplanar.

28 Claims, 4 Drawing Sheets

MOBILE COMMUNICATION DEVICE

CROSS REFERENCE TO RELATED APPLICATIONS

This application claims the benefit of priority to Korean Application No. 10-2006-0089836, filed on Sep. 15, 2006, which is herein expressly incorporated by reference.

BACKGROUND OF THE INVENTION

1. Field of the Invention

The present invention generally relates to a mobile communication device, and more particularly, a mobile communication device having a touch screen.

2. Description of Related Art

A mobile communication device including a mobile phone or a PDA is one of many mobile terminals allowing a user to wirelessly transmit, receive, read, and/or process information.

A touch screen is an input unit (i.e. user interface) installed at a display (screen) to allow various user inputs upon contact from the user's finger or stylus for writing characters, drawing figures, and the like. The touch screen is easy to use without the need for much training to understand its operation. By being integrated with the display, which requires minimal occupation space, such touch screen technology is receiving much attention in the field of display devices and is being increasingly implemented in mobile communication devices.

Various principles are applied for touch screen operation, and there are two typical methods. One method is based on static electricity (i.e., a static electricity method) wherein electric charges are charged on the surface of the screen, and sensors are installed around the screen. When the surface of the screen is contacted by the user, such is recognized by detecting the electric charge loss at the touched portion. The other method is based on resistance (i.e., a resistive film method) wherein a contact portion is recognized by detecting changes in resistance corresponding to the contacted portion in reaction to user applied pressure on the surface of the screen.

In the related art, the touch screen is formed in the mobile communication device such that edges of the mobile communication device case (i.e., body or housing) form an opening (or window) with an area that accommodates a display, and the touch screen and the display are mounted underneath the edges of the mobile communication device case.

However, the mobile communication device case edges cause a height difference (i.e., a step) between the touch screen surface and the case surface. Such structure degrades the overall exterior appearance of the mobile communication device where a smooth clean appearance cannot be achieved. Also, such case edges undesirably increases the overall thickness of the mobile communication device, which runs counter to the trend of making the mobile communication device as thin or slim as possible.

BRIEF SUMMARY OF THE INVENTION

Therefore, in order to address the above matters the various features described herein have been conceived. One aspect of the exemplary embodiments is to provide a mobile communication device having a touch screen with an improved exterior that does not have a step between the body and the touch screen.

To achieve these and other advantages and in accordance with the purpose of the present invention, as embodied and broadly described herein, there is provided a mobile communication device for receiving and transmitting wireless communication signals including a body having a border portion, a display supported by the body, a touch screen adjacent the display and defining an exterior surface of the mobile communication device such that the display is visible through the touch screen, the touch screen transferring an input signal through electrodes disposed at an edge portion of the touch screen, and an electrode covering layer located above the electrodes of the touch screen. The border portion of the body and the outermost portion of the touch screen are substantially coplanar.

In another aspect, the outermost portion of the touch screen may have the same height as that of the border portion of the body.

In yet another aspect, a mounting step with depth corresponding to the thickness of the touch screen may be provided on the body to allow the touch screen to be mounted therein.

In a further aspect, the touch screen may include a transparent support plate, a touch sensing layer mounted on the transparent support plate and having edges with electrodes, and a protection film layer disposed at an upper portion of the electrode covering layer.

In a still further aspect, the electrode covering layer may be disposed at an upper portion of the touch sensing layer. One of an upper and a lower surface of the electrode covering layer may include edges formed through an opaque printing.

In another aspect, the touch sensing layer includes a first resistive film, a second resistive film disposed apart from the first resistive film with a gap therebetween, and the electrodes include first electrodes disposed at the edges of the first resistive film and second electrodes formed at the edges of the second resistive film. The second electrodes may be perpendicular to the first electrodes.

In a further aspect, the touch sensing layer may be connected with a circuitry supporting substrate installed within the body by a flexible circuitry supporting substrate. The flexible circuitry supporting substrate may be connected with a terminal formed perpendicular to the electrodes of the touch sensing layer. The terminal penetrates the touch screen so as to extend to a lower surface of the touch screen or through the transparent support plate.

In still a further aspect, one end of the flexible circuitry supporting substrate may be connected with the electrodes of the touch sensing layer in a horizontal direction and the other end thereof may be bent in a vertical direction and may penetrate the body so as to be connected with the circuitry supporting substrate.

In another aspect, the touch screen may have a size corresponding to an entire upper surface of the body.

In yet another aspect, the touch screen includes a through hole, and at least one external key exposed through the through hole.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3I is a detail of the touch screen shown in FIG. 3;

DETAILED DESCRIPTION OF THE INVENTION

A mobile communication device having a display and touch screen will now be described in detail with reference to the accompanying drawings.

Figure 1:
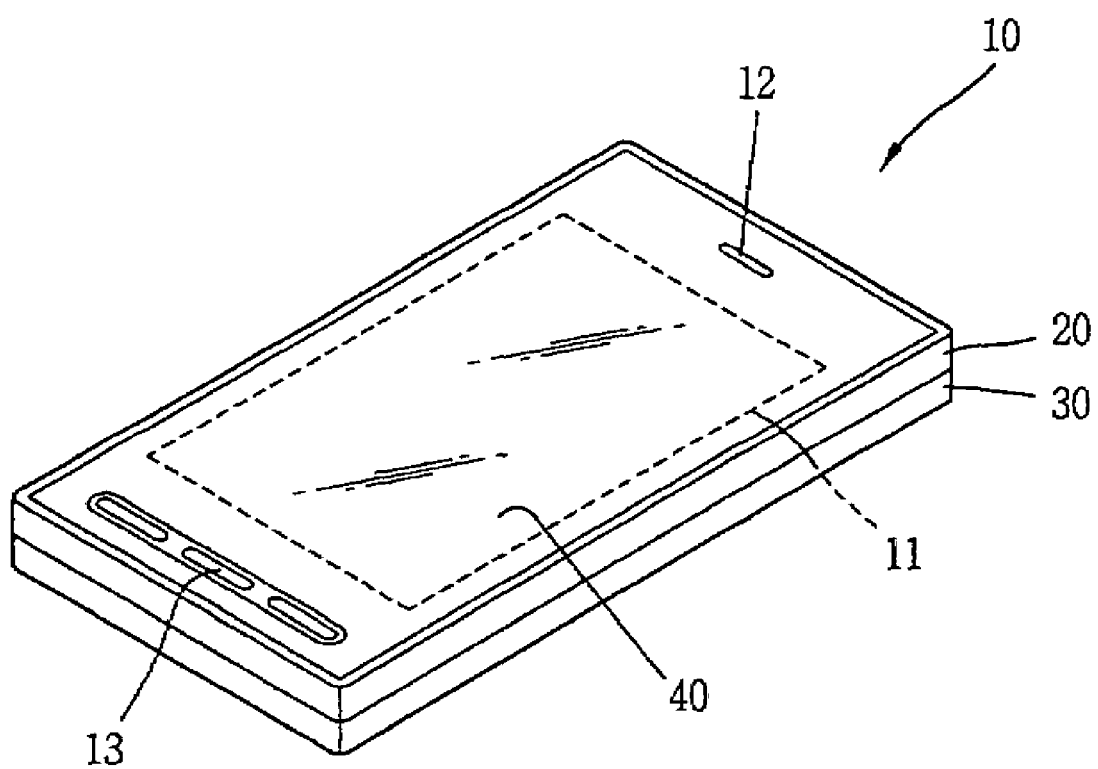
FIG. 1 is a perspective view of a mobile communication device having a touch screen according to one exemplary embodiment of the present invention.

With reference to FIG. 1, a mobile communication device 10 includes upper and lower cases 20, 30, respectively. A touch screen 40 is formed on the upper case 20 and defines an exterior surface of the mobile communication device 10.

An image display portion 11 of the mobile communication device 10 is located substantially at the middle portion of the touch screen 40 as indicated by a dotted line. A speaker unit 12 that outputs a voice and external keys 13 are provided at both upper and lower ends of the touch screen 40, respectively. Preferably, they are located outside the image display portion 11 at non-image display portions.

Figure 2:
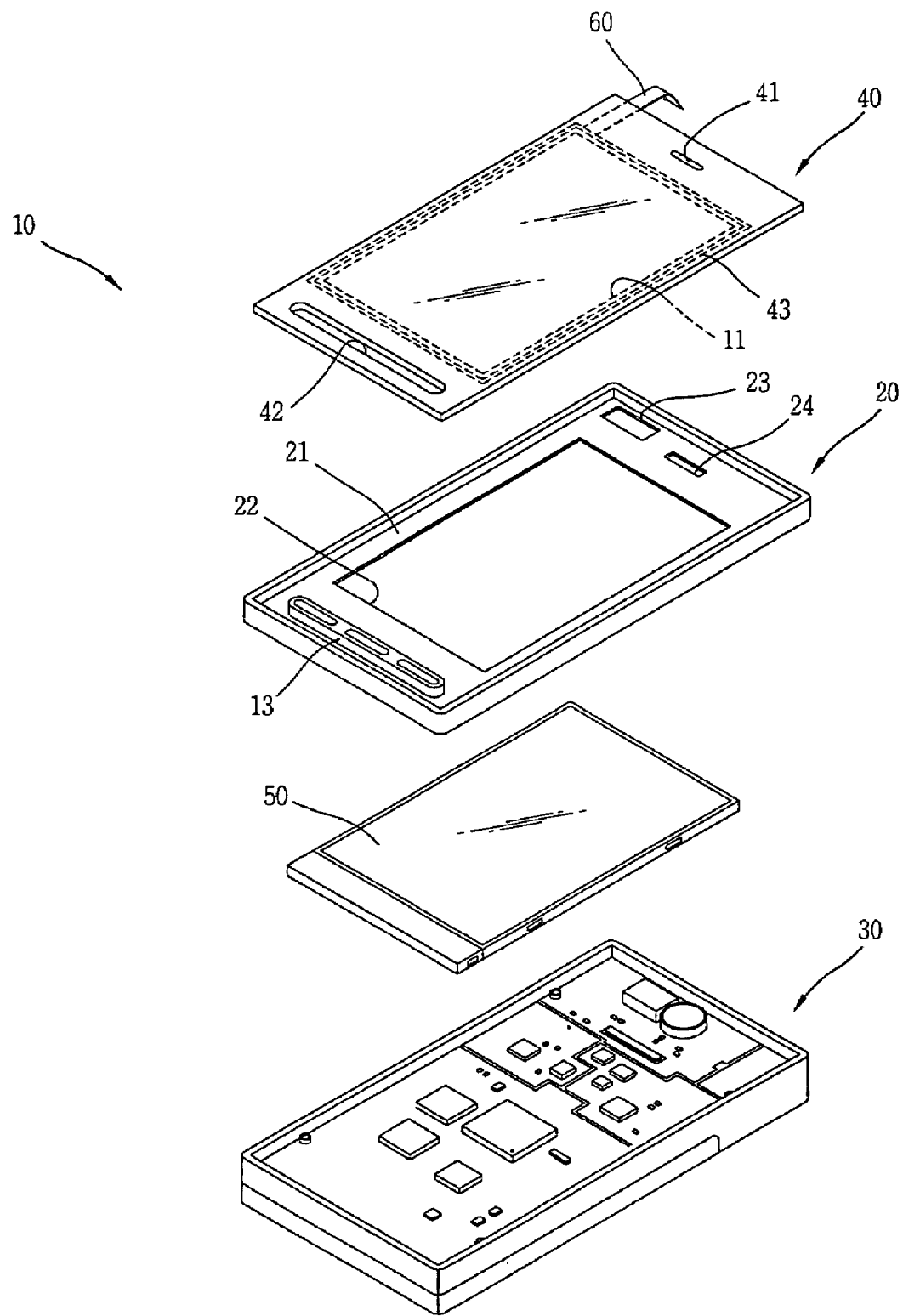
FIG. 2 is an exploded perspective view of the mobile communication device in FIG. 1.

FIG. 2 is an exploded perspective view of the mobile communication device in FIG. 1. As shown in FIG. 2, a display 50 is installed at a certain depth with respect to the upper case 20 and the touch screen 40 is provided above the display 50. The touch screen 40 includes a speaker hole 41 and an external key hole 42 corresponding to the speaker unit 12 and the external keys 13, respectively.

A resistive film method is applied to the touch screen 40 so that the touch screen 40 discriminates a resistance value corresponding to a touched portion and transfers a corresponding input signal through the electrodes 43 positioned at the edges thereof. The electrodes 43 can receive power, transmit data, and/or receive data through a flexible circuitry supporting substrate 60 connected with a lower surface of the touch screen 40.

A window 22 is formed at a lower portion of the touch screen 40 to allow light of the display 50 to pass therethrough, and a mounting step 21 with depth corresponding to thickness of the touch screen 40 is formed around the window 22. Accordingly, when the touch screen 40 is mounted on the mounting step 21, an outer layer portion (outer surface) of the touch screen 40 can have the same height as a border portion 25 of the upper case 20 (See FIG. 3).

An flexible circuitry supporting substrate through hole 23 is formed on the mounting step 21 of the upper case 20 to allow the flexible circuitry supporting substrate 60 to pass therethrough, and the external keys 13 can be supported by the mounting step 21. A speaker hole 24 corresponding to the speaker unit 12 is formed in the mounting step 21.

Figure 3:
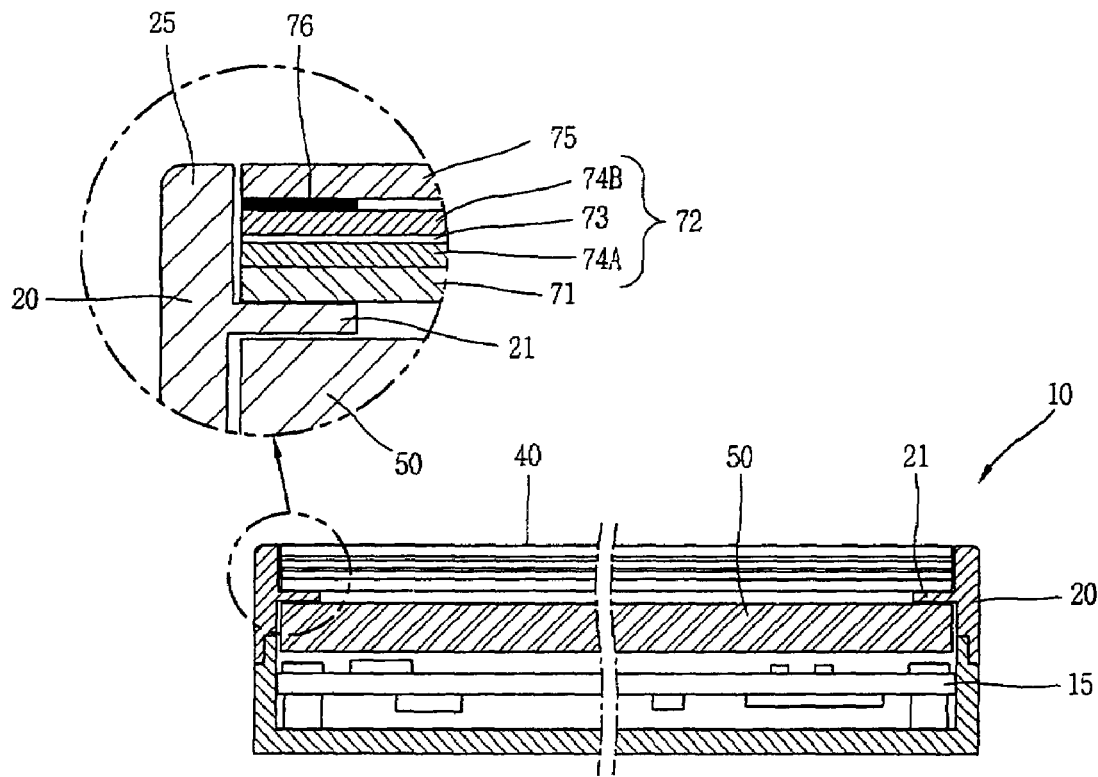
FIG. 3 is a cross-sectional view of the mobile communication device in FIG. 1.
Figure 4:
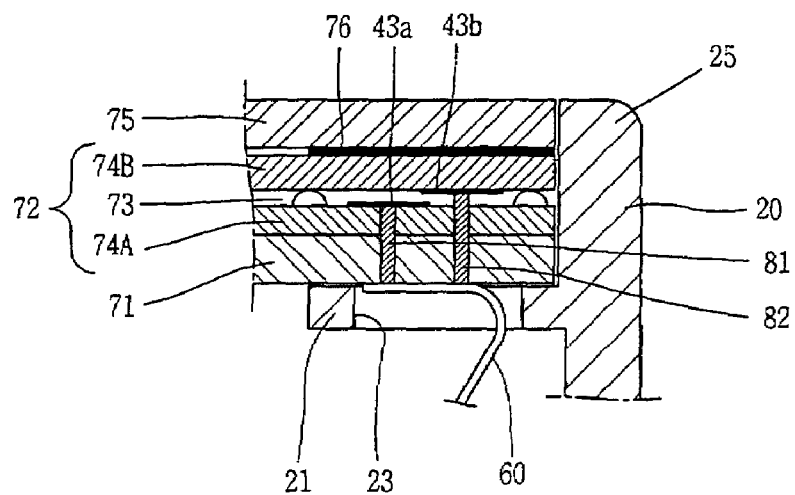
FIG. 4 is a sectional view showing a flexible circuitry supporting substrate that connects the touch screen and its peripheral parts according to one exemplary embodiment of the present invention.

FIG. 3 is a cross-sectional view of the mobile communication device in FIG. 1, and FIG. 4 is a sectional view showing a flexible circuitry supporting substrate that connects the touch screen and its peripheral parts according to one exemplary embodiment of the present invention.

As shown in FIGS. 3 and 4, the outer layer portion of the touch screen 40 has the same height as the border portion 25 of the upper case 20, resulting in a smooth overall exterior surface of the mobile communication device.

The touch screen 40 includes a transparent support plate 71 mounted on the mounting step 21, a touch sensing layer 72 mounted on the transparent support plate 71 and having electrodes 43a, 43b disposed at its edges (seen in FIG. 4), an electrode covering layer 76 disposed on the touch sensing layer 72, and a protection film layer 75 disposed on the electrode covering layer 76, which are formed in a stacking manner.

Upper or lower surfaces of the edges of the electrode covering layer 76 may be formed through opaque printing, or an opaque pigment may be mixed with a base material so that the electrodes 43a, 43b positioned at the lower portion of the electrode covering layer 76 are not visible. The electrode covering layer 76 provides a boundary line of the display 50 in order to discriminate an image display part 11 and a non-image display part. As such, the electrode covering layer 76 may be larger or smaller that the display 50.

As seen in FIG. 4, the touch sensing layer 72 includes a first resistive film 74A with first electrodes 43a disposed on the edges, and a second resistive film 74B disposed at a certain gap by a spacer 73 from the first resistive film 74A and having second electrodes 43b disposed at the edges and being perpendicular to the first electrodes 43a. Herein, the first and second electrodes 43a and 43b can be disposed by a 4-line resistive film method or 5-line resistive film method.

Accordingly, when an arbitrary portion of the touch screen 40 is touched, the first resistive film 74A and the second resistive film 74B contact to be electrically connected with each other at the arbitrary portion. Then, the contact portion of the first and second resistive films 74A and 74B can be detected through an electric current signal that flows at the first and second electrodes 43a and 43b and the mobile communication device 10 inputs the corresponding input value.

With reference to FIG. 4, the touch sensing layer 72 is connected to the flexible circuitry supporting substrate 60, and the flexible circuitry supporting substrate 60 is connected with a circuitry supporting substrate 15 (See FIG. 3) installed within the mobile communication device 10. The flexible circuitry supporting substrate 60 is connected with terminals 81 and 82 formed to be perpendicular from the electrodes 43a and 43b of the touch sensing layer 72.

Figure 5:
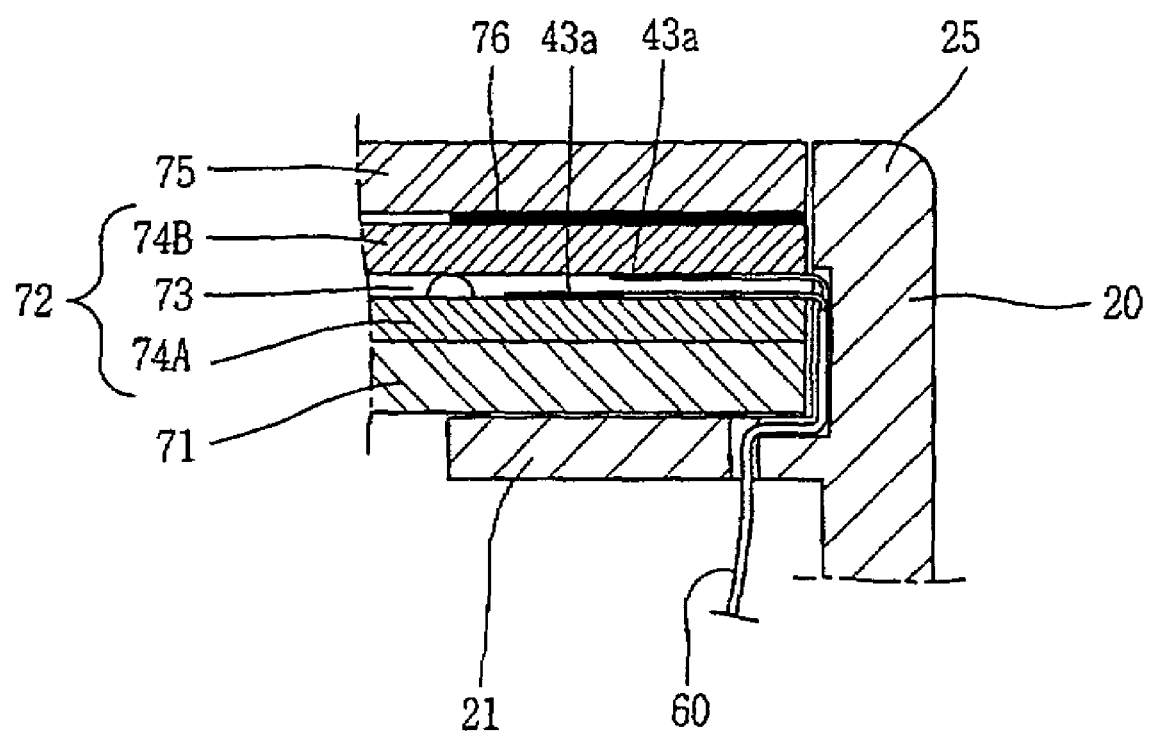
FIG. 5 is a sectional view showing the flexible circuitry supporting substrate that connects the touch screen and its peripheral parts according to another exemplary embodiment of the present invention.

In a different exemplary embodiment of the present invention, as shown in FIG. 5, the flexible circuitry supporting substrate 60 can be formed such that one end thereof is connected in a horizontal direction from the electrodes 43a and 43b of the touch sensing layer 72 and the other end thereof is bent in a vertical direction and penetrates through a mounting step 21 so as to be connected with the circuitry supporting substrate 15.

With such a structure, the touch screen 40 can have the electrode covering layer 76 that can cover the electrodes 43a and 43b while reflecting content displayed on the display 50.

Preferably, the touch screen 40 has an integrated form that covers the entire upper surface of the mobile communication device 10 (or a substantial portion thereof). As such, portions that are too wide (or large in size), too complicated, and/or having undesirable bends or curves are not employed, thus improving the exterior appearance of the mobile communication device. In particular, the upper case 20 does not need to have a portion to wrap over the edge(s) of the touch screen 40, so the outer surface of the touch screen 40 can have the same height as (i.e., is flush with) the border portion 25 of the upper case 20. As a result, the overall thickness of the mobile communication device 10 can be minimized (i.e., a slim profile can be provided).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile communication terminal comprising:
   a case having a border portion;
   a display supported by the case;
   a touch screen adjacent the display and defining an exterior surface of the mobile communication terminal such that the display is visible, the touch screen transferring an input signal through electrodes disposed at an edge portion of the touch screen; and
   an electrode covering layer located above the electrodes, the electrode cover layer not being overlapped by the border portion of the case,
   wherein the border portion of the case and the outermost portion of the touch screen are substantially coplanar, and
   wherein the touch screen comprises:
      a transparent support plate;
      a touch sensing layer fixed on the transparent support plate and having electrodes formed at its edges; and
      a protection layer disposed at an upper portion of the electrode covering layer.

2. The mobile communication terminal of claim 1, wherein the outermost portion of the touch screen has the same height as that of the border portion of the case.

3. The mobile communication terminal of claim 1, wherein a mounting step with depth corresponding to the thickness of the touch screen is provided on the case to allow the touch screen to be mounted therein.

4. The mobile communication terminal of claim 3, wherein the touch screen includes:
   a transparent support plate;
   a touch sensing layer mounted on the transparent support plate and having electrodes formed at its edges;
   a protection film layer disposed at an upper portion of the electrode covering layer; and
   the electrode covering layer is disposed at an upper portion of the touch sensing layer.

5. The mobile communication terminal of claim 4, wherein the touch sensing layer comprises:
   a first resistive film;
   a second resistive film disposed apart from the first resistive film with a gap therebetween; and
   the electrodes include first electrodes disposed at the edges of the first resistive film and second electrodes formed at the edges of the second resistive film, the second electrodes being perpendicular to the first electrodes.

6. The mobile communication terminal of claim 4, wherein the touch sensing layer is connected with a circuit board installed within the case by a flexible printed circuit board (FPCB).

7. The mobile communication terminal of claim 6, wherein the FPCB is connected with a terminal formed perpendicular to the electrodes of the touch sensing layer.

8. The mobile communication terminal of claim 6, wherein one end of the FPCB is connected with the electrodes of the touch sensing layer in a horizontal direction and the other end thereof is bent in a vertical direction and penetrates the mounting step so as to be connected with circuit board.

9. The mobile communication terminal of claim 1, wherein the electrode covering layer is disposed at an upper portion of the touch sensing layer.

10. The mobile communication terminal of claim 9, wherein one of an upper and a lower surface of the electrode covering layer includes edges formed with an opaque printing.

11. The mobile communication terminal of claim 1, wherein the touch sensing layer is connected with a circuit board installed within the case by a flexible printed circuit board (FPCB) disposed within the case.

12. The mobile communication terminal of claim 11, wherein the FPCB is connected with a terminal formed perpendicular to the electrodes of the touch sensing layer.

13. The mobile communication terminal of claim 12, wherein the terminal penetrates the touch screen so as to extend to a lower surface of the touch screen.

14. The mobile communication terminal of claim 12, wherein the terminal penetrates the touch screen so as to extend to a lower surface of the transparent support plate.

15. The mobile communication terminal of claim 11, wherein one end of the FPCB is connected with the electrodes of the touch sensing layer in a horizontal direction and the other end thereof is bent in a vertical direction and penetrates the case so as to be connected with the circuit board.

16. The mobile communication terminal of claim 1, wherein the touch screen may have a size corresponding to an entire upper surface of the case.

17. The mobile communication terminal of claim 1, wherein the touch screen comprises:
   at least one through hole; and
   an external key exposed through the through hole.

18. The mobile communication terminal of claim 1, wherein the touch screen comprises a touch sensing layer to discriminate a resistance value corresponding to a touched portion, and the electrode covering layer is located on an upper surface of the touch sensing layer.

19. The mobile communication terminal of claim 1, wherein the touch screen includes a touch sensing layer to discriminate a resistance value corresponding to a touched portion, and the electrode covering layer is located within the touch screen.

20. The mobile communication terminal of claim 1, wherein the protection layer is a protection film layer.

21. A mobile communication terminal comprising:
   a case having a border portion;
   a display supported by the case;
   a touch screen adjacent the display and defining an exterior surface of the mobile communication terminal such that the display is visible, the touch screen transferring an input signal through electrodes disposed at an edge portion of the touch screen; and
   an electrode covering layer located above the electrodes, wherein the border portion of the case and the outermost portion of the touch screen are substantially coplanar, and wherein the touch sensing layer comprises:
a first resistive film;
a second resistive film disposed apart from the first resistive film with a gap therebetween; and
the electrodes include first electrodes disposed at the edges of the first resistive film and second electrodes formed at the edges of the second resistive film.

22. The mobile communication terminal of claim 20, wherein the second electrodes are perpendicular to the first electrodes.

23. A mobile communication terminal comprising:
a case having a border portion;
a display supported by the case;
a touch screen adjacent the display and defining an exterior surface of the mobile communication terminal such that the display is visible, the touch screen transferring an input signal through electrodes disposed at an edge portion of the touch screen; and
an electrode covering layer applied to the touch screen, the electrode covering layer being located above the electrodes,
wherein the border portion of the case and the outermost portion of the touch screen are substantially coplanar, and
wherein the touch screen includes:
a transparent support plate;
a touch sensing layer fixed on the transparent support plate and having electrodes formed at its edges; and
a protection layer disposed at an upper portion of the electrode covering layer.

24. The mobile communication terminal of claim 23, wherein the outermost portion of the touch screen has the same height as that of the border portion of the case.

25. The mobile communication terminal of claim 23, wherein a mounting step with depth corresponding to the thickness of the touch screen is provided on the case to allow the touch screen to be mounted therein.

26. The mobile communication terminal of claim 23, wherein the electrode covering layer is disposed at an upper portion of the touch sensing layer.

27. The mobile communication terminal of claim 26, wherein one of an upper and a lower surface of the electrode covering layer includes edges formed with an opaque printing.

28. The mobile communication terminal of claim 23, wherein the protection layer is a protection film layer.

* * * * *